A. STRICKLAND.
SAW SHARPENER.
APPLICATION FILED SEPT. 29, 1910.
1,006,986.
Patented Oct. 24, 1911.
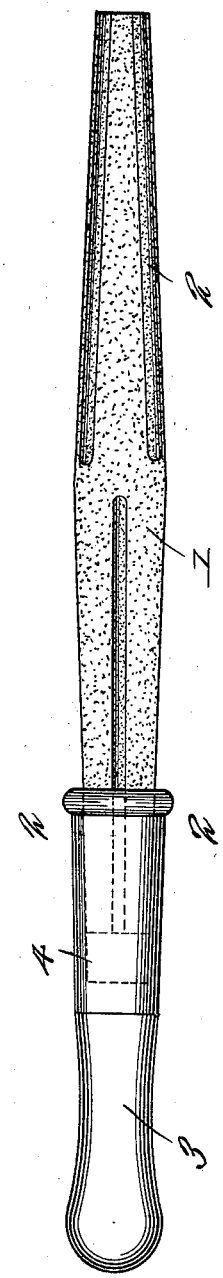
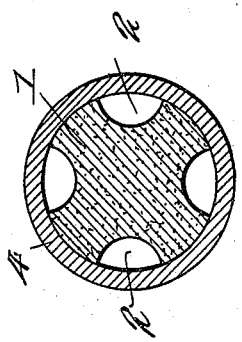
Witnesses
Frank B. Hoffman
R. M. Smith
Inventor
Allison Strickland
By Victor J. Evans.
Attorney

UNITED STATES PATENT OFFICE.

ALLISON STRICKLAND, OF DRUMMOND, MICHIGAN.

SAW-SHARPENER.

1,006,986.  Specification of Letters Patent.  Patented Oct. 24, 1911.

Application filed September 29, 1910. Serial No. 584,505.

*To all whom it may concern:*

Be it known that I, ALLISON STRICKLAND, a citizen of the United States, residing at Drummond, in the county of Chippewa and State of Michigan, have invented new and useful Improvements in Saw-Sharpeners, of which the following is a specification.

This invention relates to saw sharpeners, the object of the invention being to provide a saw sharpening implement in the nature of a file of peculiar formation adapted to be manipulated by hand in contact with the teeth of the saw for uniformly sharpening and shaping the same.

With the above object in view the invention consists in the novel construction, combination and arrangement of parts herein fully described, illustrated and claimed.

In the accompanying drawings: Figure 1 is a plan view of a saw sharpening implement constructed in accordance with the present invention. Fig. 2 is a cross section through the same on the line 2—2 of Fig. 1, on an enlarged scale.

The sharpener contemplated in this invention comprises an oblong body 1 which is conical cylindrical at each end, being of the largest diameter at the center and tapering to smaller diameters at its opposite ends. Each tapering end portion of the body has formed therein at equidistant points grooves or channels 2 substantially semi-circular in cross section and the entire concaved surface of which is abrasive. The grooves arranged circumferentially on one tapering end of the body 1 and extending lengthwise thereof are arranged intermediate the grooves on the opposite tapering end of the body. While in the preferred embodiment of the invention I employ four of said grooves or channels as illustrated in Fig. 2 it will be apparent that the number of grooves or channels may be varied at will to suit the manufacturer and consumer in accordance with the nature of the work to be performed.

In connection with the body 1 I employ a handle 3 embodying a socket portion 4 which is made tapering to conform to the shape of the end of the body of the sharpener and to receive either end of the same as shown in Fig. 1.

The sharpening implement is designed for use in connection with and upon saw teeth of a semicircular or half round shape and as the channels 2 are of uniform width throughout their entire length, all of the teeth of the saw may be brought to exactly the same size by the proper manipulation of the sharpener.

The sharpener may be formed of a composition of cement and emory dust molded while in a plastic state into the desired form or the sharpener may be formed of cast iron and similar to the steel file.

I claim:—

1. A saw sharpening implement comprising an elongated body which decreases in size from a medial point toward its ends, semi-circular grooves arranged circumferentially of the body and extending from the medial portion of the body outward to the ends, the grooves upon one tapering end arranged intermediate the ones upon the opposite tapering end, substantially as described.

2. A saw sharpening implement comprising an elongated body provided with an abrasive surface, said body tapering from a medial point toward its ends and provided with sets of semi-circular grooves, each set of grooves extending from the medial point outward toward the ends of the body, the grooves of one set being arranged intermediate the grooves of the other set, in combination with a handle provided with a tapered internal socket adapted to receive either end of the sharpening implement, substantially as and for the purpose set forth.

In testimony whereof I affix my signature in presence of two witnesses.

ALLISON STRICKLAND.

Witnesses:
H. B. HITCHCOCK,
J. T. BENNETT.

Copies of this patent may be obtained for five cents each, by addressing the "Commissioner of Patents, Washington, D. C."